United States Patent
Fenech et al.

(10) Patent No.: US 7,768,956 B2
(45) Date of Patent: Aug. 3, 2010

(54) METHOD FOR THE OPTIMIZATION OF THE PAYLOAD OF A MULTISPOT TELECOMMUNICATION SATELLITE

(75) Inventors: Hector Fenech, Issy les Moulineaux (FR); Emmanuel Lance, Clichy (FR)

(73) Assignee: Eutelsat, Paris (FR)

( * ) Notice: Subject to any disclaimer, the term of this patent is extended or adjusted under 35 U.S.C. 154(b) by 337 days.

(21) Appl. No.: 12/075,711

(22) Filed: Mar. 13, 2008

(65) Prior Publication Data

US 2009/0109853 A1    Apr. 30, 2009

(30) Foreign Application Priority Data

Oct. 30, 2007    (FR) .................................. 07 58690

(51) Int. Cl.
*H04B 7/185* (2006.01)
*H04B 7/212* (2006.01)
*H04B 7/14* (2006.01)
*H04W 4/00* (2009.01)
*H04W 40/00* (2009.01)

(52) U.S. Cl. ........................ 370/316; 370/321; 370/330; 370/338; 455/12.1; 455/13.3; 455/20; 455/428

(58) Field of Classification Search ................ 370/321, 370/330, 338, 316; 455/12.1, 13.3, 20, 428
See application file for complete search history.

(56) References Cited

U.S. PATENT DOCUMENTS

| | | | |
|---|---|---|---|
| 2002/0068526 A1* | 6/2002 | Butte et al. ............... | 455/13.1 |
| 2003/0134592 A1* | 7/2003 | Franzen et al. ............ | 455/12.1 |
| 2008/0056189 A1* | 3/2008 | Hudson et al. ............ | 370/330 |
| 2008/0153414 A1* | 6/2008 | Ho et al. ................... | 455/12.1 |

* cited by examiner

*Primary Examiner*—Huy D Vu
*Assistant Examiner*—Brandon Renner
(74) *Attorney, Agent, or Firm*—Davidson, Davidson & Kappel, LLC

(57) ABSTRACT

A method for the optimization of the payload of a multispot telecommunication satellite is disclosed. This type of satellite allows the use of several antenna spots on board the satellite to cover contiguous geographical zones, instead of a single broad spot. The method uses the division of an amplification unit such as a travelling wave tube TWTA between several spots.

17 Claims, 5 Drawing Sheets

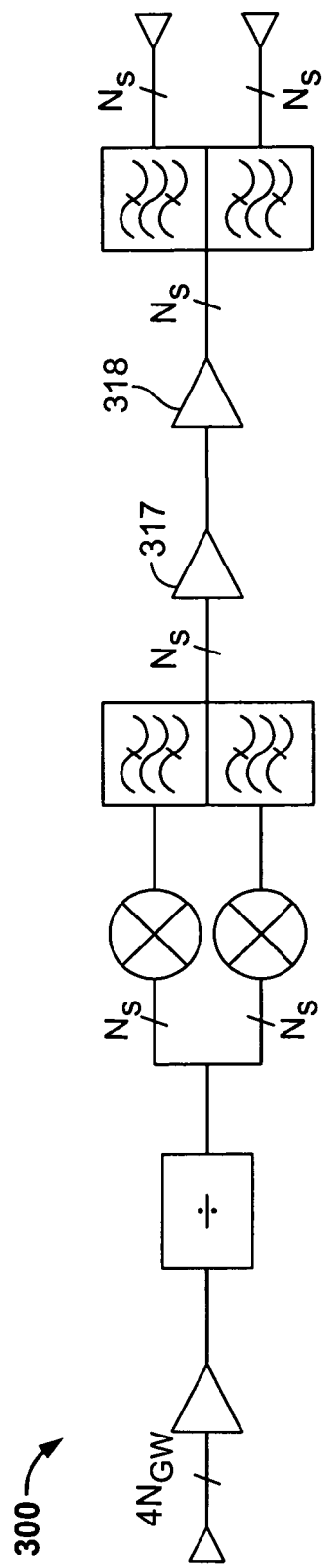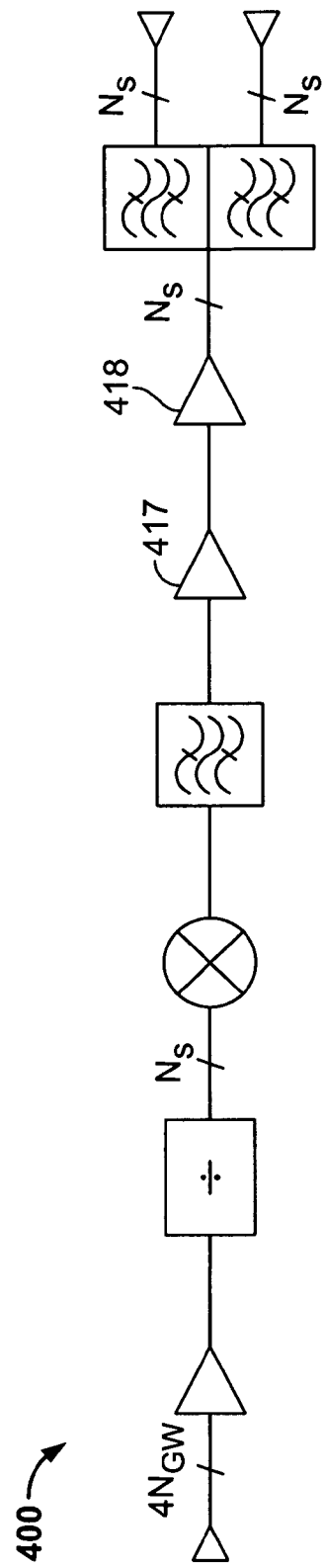
FIG. 2D
FIG. 2E

METHOD FOR THE OPTIMIZATION OF THE PAYLOAD OF A MULTISPOT TELECOMMUNICATION SATELLITE

This claims priority to French Patent Application FR 07/58690, filed Oct. 30, 2007, the entire disclosure of which is incorporated by reference herein.

BACKGROUND

The present invention concerns a method for the optimization of the payload of a telecommunication satellite with several spots, known as a multispot or multibeam satellite. This type of satellite allows several antenna spots to be used on board the satellite to cover contiguous geographical zones, instead of a single broad spot.

Such multispot satellites allow several radiofrequency links to be established occupying the same frequency band on different spots. An example of multispot configuration is illustrated in FIG. 1. Signals are sent towards a satellite 3 on an uplink LM by a terrestrial station 2 such as a gateway connected to an internet backbone 5. These signals are then processed at the level of the satellite 3 then retransmitted on a downlink LD in the form of a plurality of spots or spots SP1 to SP8.

In addition, certain multispot satellites allow polarized transmissions to be emitted (and received): the polarization can be linear (in this case the two directions of polarization are respectively horizontal and vertical) or circular (in this case the two directions of polarization are respectively circular left or circular right).

It will be noted that in the example of FIG. 1, the uplink leaving the station 2 uses two polarizations with four channels for each polarization, respectively Ch1 to Ch4 for the first polarization and Ch5 to Ch8 for the second polarization. The eight channels Ch1 to Ch8, after processing by the payload of the satellite 3 will form the 8 spots SP1 to SP8 (one channel being associated with one spot in this example).

The payload of the satellite designates the part which allows it to fulfil the mission for which it was designed, i.e. for a telecommunication satellite 3 such as that shown in FIG. 1, to ensure the reception, processing (frequency conversion, filtering, amplification) and re-emission of the telecommunication signals issued from the terrestrial station 2. The payload essentially comprises the antennae of the satellite and the transponders (and not the equipment for control, propulsion or electrical power equipment which belong to the platform of the satellite).

FIG. 2a shows in a known manner a functional block diagram of an architecture of payload 10 with multispot emission on the downlink. After reception and selection of the polarization, the signal received from a gateway is amplified by a LNA low noise amplifier 12. The signal is then separated in $N_s$ uplink channels by a signal divider device 13. The $N_s$ uplink channels are then translated in frequency by a frequency converter circuit 14 generally formed by a local oscillator and are filtered by an input filter 15 (of the pass band filter type) so as to form Ns channels in accordance with the frequency plan of the downlink. The local oscillator is most often constituted by a voltage controlled quartz VCO (Voltage Controlled Oscillator) with a phase lock loop. The $N_s$ translated frequency channels are amplified through a power amplifier 16 HPA (High Power Amplifier) generally formed by a channel amplifier 17 CAMP (Channel AMPlifier) and a travelling wave tube amplifier 18 TWTA forming $N_s$ downlink spot signals. The channel amplifiers 17 are generally gain command amplifiers which allow the power level of the signals to be regulated at input of the travelling wave tubes 18. The tubes 18 can be replaced by solid state power amplifiers SSPA. It is likewise possible to use more sophisticated architectures comprising devices of the MPA type (multiport amplifier) offering the advantage of flexibility. Each of the $N_s$ spot signals is then filtered through an output pass band filter 19, and is then sent on a feed 20 such as a feedhorn towards a reflector for the formation of a spot. According to this configuration, if the number of gateways is designated by $N_{GW}$, the payload 10 comprises:

- $2N_{GW}$ low noise amplifiers 12 LNA;
- $2N_{GW}$ signal divider devices 13;
- $N_s$ frequency converter circuits 14;
- $N_s$ input filters 15;
- $N_s$ high power amplifiers 16 HPA;
- $N_s$ output pass band filters 19;
- $N_s$ feedhorns 20.

However, such a configuration is liable to pose some difficulties. In fact, according to the architecture of FIG. 2a, the number of frequency converters, input filters, channel amplifiers and travelling wave tube amplifiers is equal to the numbers of downlink spots $N_s$. Consequently, for large-scale systems, the high number of components forming the payload becomes disadvantageous in terms of mass and the launching of the space vehicle. Of course, these disadvantgages likewise have an impact on the associated costs.

SUMMARY OF THE INVENTION

In this context, the present invention aims to provide a method for the optimization of the payload of a multispot telecommunication satellite allowing the mass of the payload to be reduced, whilst maintaining the requirements with regard to effective isotropic radiated power EIRP. To this end, the invention proposes a method for the optimization of the payload of a multispot telecommunicaton satellite, designated optimized payload, from a reference payload for the formation of $N_s$ spots on a downlink, $N_s$ being a whole natural number strictly greater than 1, said reference payload comprising amplification means formed:

either by $N_s$ first amplification units comprising an input and an output, each of the $N_s$ first amplification units being intended to amplify a spot, or by a first amplification equipment comprising $N_s$ inputs and $N_s$ outputs and intended to amplify the $N_s$ spots, said optimization being realized in response to one of the following two criteria:

first criterion: the capacity of said reference payload is conserved and the area of the covering zone of said payload is divided by N, N being a natural whole number strictly greater than 1 so that $N_s$ is a multiple of N;

second criterion: the area of the covering zone of said payload is conserved and said capacity is multiplied by N;

according to said first criterion, said process comprises the following stages:

comparison of said number $N_s$ of spots with a threshold number of spots $N_{threshold}$ or comparison of said capacity with a threshold capacity $C_{threshold}$;

if $N_s$ is greater than $N_{threshold}$ or if said capacity is greater than $C_{threshold}$:

when said amplification means are formed by said $N_s$ first amplification units: substitution in said optimized payload of said $N_s$ first units by $N_s/N$ second amplification units, each of the $N_s/N$ second amplification units being intended to amplifiy N spots;

when said amplification means are formed by said first amplification equipment: substitution in said optimized payload of said first equipment by a second amplification equipment comprising $N_s/N$ inputs and $N_s/N$ outputs and intended to amplify the $N_s$ spots distributed over said $N_s/N$ inputs;

according to said second criterion, said process comprises the following stages:

when said amplification means are formed by said $N_s$ first amplification units: substitution in said optimized payload of said $N_s$ first units by $N_s$ third amplification units, each of said $N_s$ third amplification units being intended to amplify N spots;

when said amplification means are formed by said first amplification equipment: substitution in said optimized payload of said first equipment by a third amplification equipment comprising $N_s$ inputs and $N_s$ outputs and intended to amplify $N \times N_s$ spots distributed over said $N_s$ inputs.

As already stated above, the payload of the satellite is understood to mean the part which allows it to ensure the reception, processing and re-emission of the telecommunication signals issued from the terrestrial station. The payload comprises essentially the antennae of the satellite and the transponders.

Capacity is understood to mean the band pass capacity $C_{FWD}$ of the satellite expressed in Hz and defined by the following formula:

$$C_{FWD} = \text{Min}\left(\frac{P_{FWD}N_s G}{eirp}, N_s B_{spot}\right)$$

in which:

Min(x, y) is a function providing the smallest value of x or of y, $P_{FWD}$ is the RF power of the repeater on the feedhorn of the antenna expressed in W, $N_x$ is the number of spots, G designates the gain of the antenna in dB, eirp is the effective isotropic radiated power (also designated PIRE in French) in dBW/Hz, $B_{spot}$ is the band pass available per spot on the basis of a single polarization expressed in Hz.

With the invention, the sharing of a unit of amplification such as a travelling wave tube TWTA or an SSPA amplifier between several spots (or the division of an equipment of the MPA type) may be advantageously used. One can also use the sharing of an equipment of the MPA type by reducing the number of inputs/outputs of the MPA remaining at constant capacity.

Two criteria can be retained to determine the optimized payload:

either the same capacity is conserved as in a standard payload such as that described with reference to FIG. 2a) and the number of TWTA tubes is reduced by a factor N, thus entailing a reduction of the total mass of the payload, of the continuous power DC required and the thermal dissipation; in this case, the sharing of each tube by several spots becomes of interest when the number of spots exceeds a threshold value;

or one conserves the same covering zone area as for the payload of FIG. 2a) and the same number of TWTA tubes are retained; in this case, the capacity is increased by a factor N, whilst the mass of the payload is increased by a factor less than N; in this configuration, the sharing of a tube for several spots is still more advantageous in terms of mass than the association of one spot per tube.

The device according to the invention may likewise present one or more of the following characteristics, considered individually or in accordance with all the combinations which are technically possible. Advantageously, the determination of the said threshold number of spots $N_{threshold}$ comprises the following stages:

determination of the mass of said reference payload as a function of the number of spots $N_s$;

determination of the optimized payload as a function of the spot number $N_s$;

determination of $N_{threshold}$ when the respective masses of said reference load and of said optimized load are equal.

According to a preferred form of embodiment, the natural whole N is equal to 2. Advantageously, the threshold number of spots $N_{threshold}$ may be greater than 15 and preferably greater than 20, these numbers being liable to evolve with the technologies which are used. According to a first preferred form of embodiment, said amplification units are formed by travelling wave tubes TWTA. According to a second, said amplification units are formed by semiconductor amplifiers SSPA. According to a preferred third form of embodiment, said amplification equipment are formed by multiport amplifiers MPA.

Advantageously, the method according to the invention may comprises a reduction stage of a factor N of the number of frequency converters comprised in said payload optimized by regrouping per group of N channels in the frequency plan of the downlink. Advantageously, said capacity $C_{threshold}$ is greater than or equal to 5 Ghz, this number being able to evolve as a function of the technology which is used.

BRIEF DESCRIPTION OF THE DRAWINGS

Other characteristics and advantages of the invention will clearly emerge from the description which is given thereof below, by way of indication and in no way restrictive, with reference to the attached figures, in which.

DETAILED DESCRIPTION

In all the figures, the common elements bear the same reference numbers.

Figure 1:
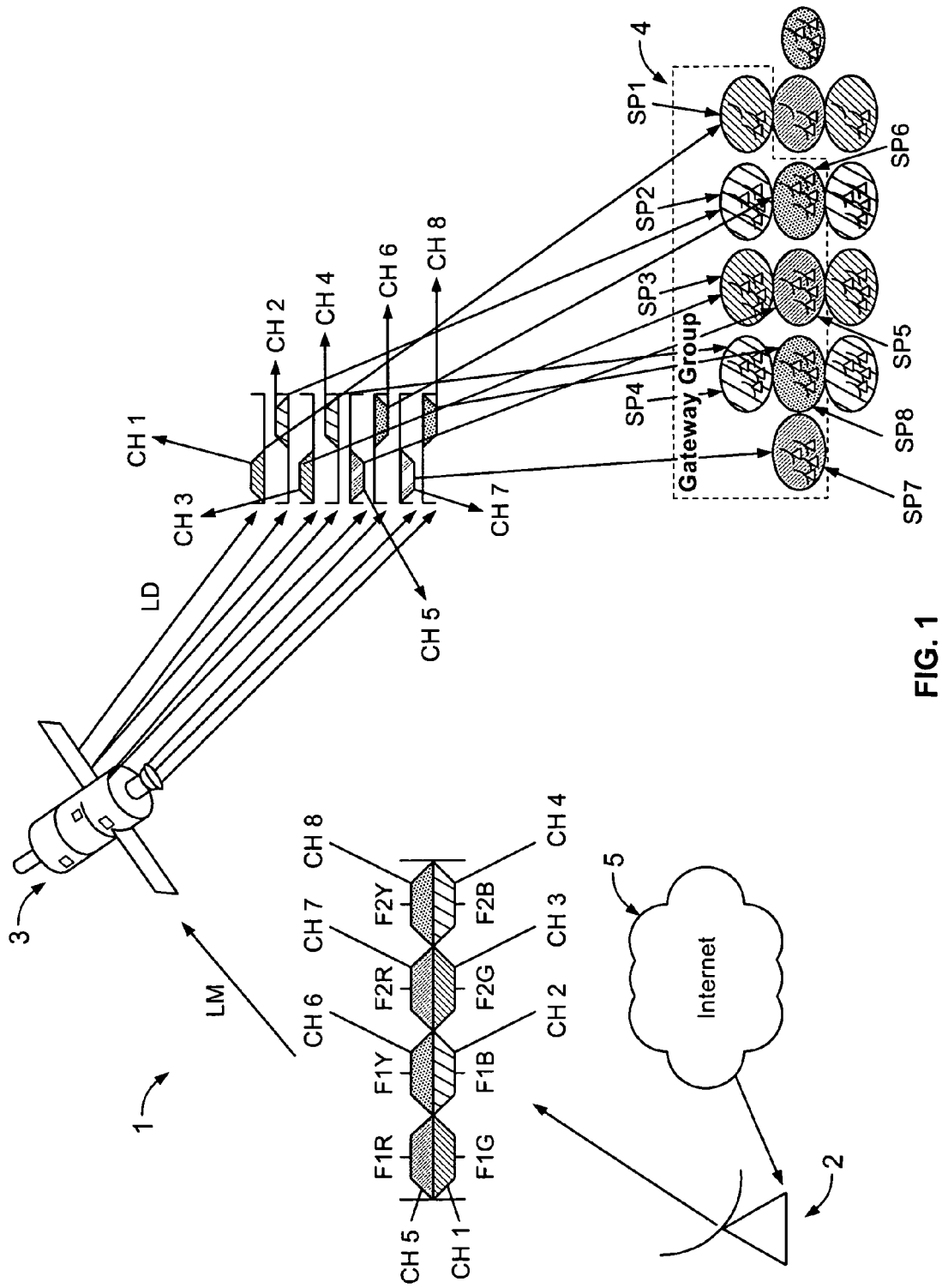
FIG. 1 is a simplified diagrammatic illustration of a multi-spot configuration.
Figure 2A:
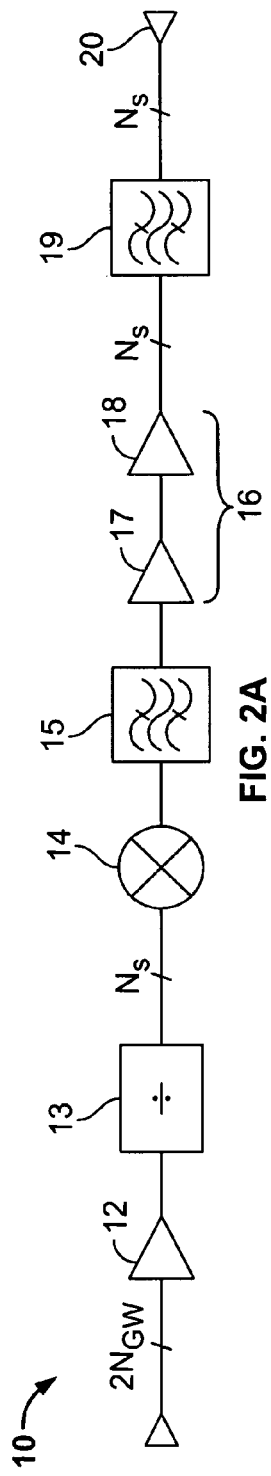
FIG. 2a) is a functional block diagram of an architecture of reference payload according to the prior art.

FIGS. 1 and 2a) have previously been described with reference to the prior art.

Figure 2B:
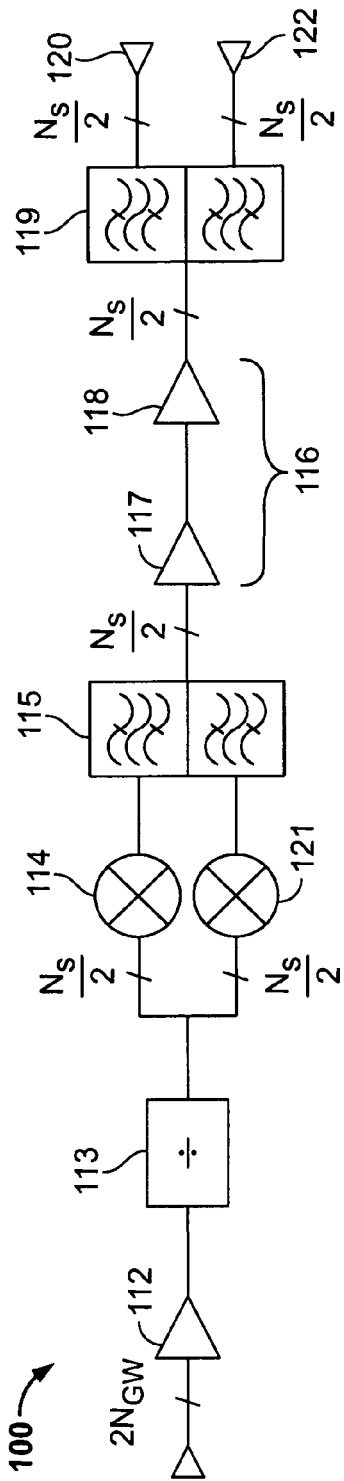
FIGS. 2b) and 2c) each represent a functional block diagram of an architecture of optimized payload by the process according to the invention as a function of the first criterion, respectively without and with constraint on the frequency plan.

FIG. 2b) represents a functional block diagram of an architecture of payload 100 with multispot emission on the downlink optimized by the method according to the invention.

After reception and selection of the polarization, the received signal is amplified by a low noise amplifier 112 LNA. The signal is then separated in $N_s$ uplink channels by a signal divider device 113. The $N_s$ uplink channels are then translated in frequency by a frequency converter circuit 114 or 121. The converters 114 and 121 form a pair of converters mounted in parallel so that each provides an input of an input multiplexer 115 realizing a filtering so as to form a filtered signal regrouping the two input channels.

The $N_s/2$ signals with two channels of translated frequency are amplified through a high power amplifier 116 HPA generally formed by a channel amplifier 117 CAMP and a travelling wave tube amplifier 118 TWTA forming $N_s/2$ signals regrouping two downlink spots. Each of the $N_s/2$ signals regrouping two spots is then separated and filtered through an output demultiplexer 119 so as to form two downlink spot signals.

Each of the $N_s$ downlink spot signals is then sent over a source 120 such as feedhorn which radiates towards a reflector for the formation of a spot. According to this configuration, if one designates by $N_{GW}$ the gateway number, the payload 100 comprises:

- $2N_{GW}$ low noise amplifiers 112 LNA;
- $2N_{GW}$ signal divider devices 113
- $N_s/2$ frequency converter circuits 114 and $N_s/2$ frequency converter circuits 121;
- $N_s/2$ input multiplexers 115;
- $N_s/2$ high power amplifiers 116 HPA;
- $N_s/2$ output demultiplexers 119;
- $N_s$ feedhorns 20.

It will be noted that each travelling wave tube 118 drives the amplification of two spots here; even if the invention illustrates more particularly the case of a driving of two spots, the invention applies equally to a higher number N of spots driven by the same travelling wave tube. It is found that the payload 100 allows a reduction of a factor N of the number of TWTA in relation to the payload 10 of FIG. 2a).

Figure 3:
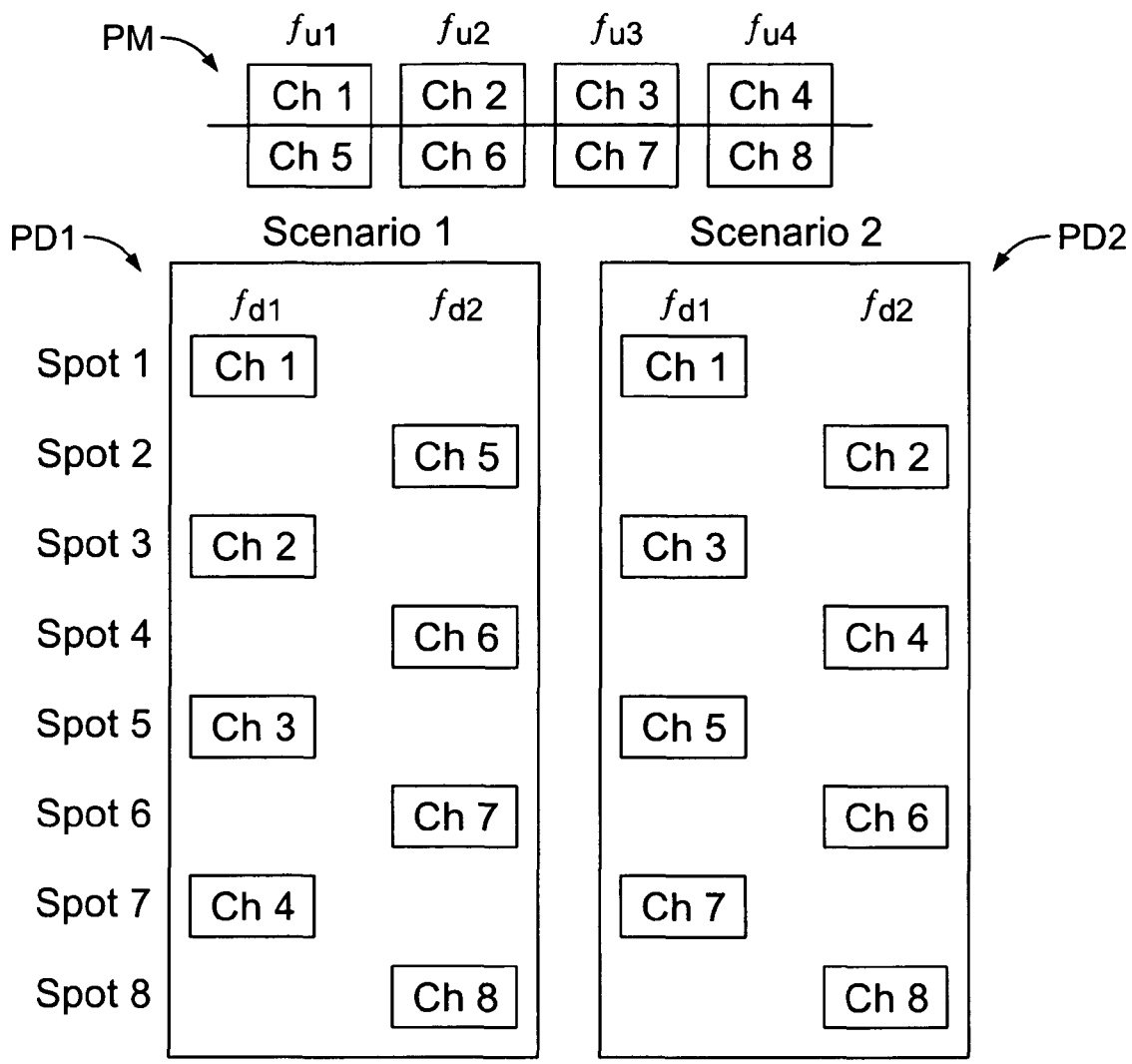
FIG. 3 represents two configurations of frequency plans of uplink and downlink.

FIG. 3 illustrates two possible scenarios allowing an uplink frequency plan PM to be made compatible with a first downlink frequency plan PD1 (scenario 1) or a second downlink frequency plan PD2 (scenario 1). As in the case of FIG. 1, the uplink uses two polarizations with four channels for each polarization, respectively Ch1 to Ch4 for the first polarization and Ch5 to Ch8 for the second polarization.

According to the frequency plan PM, the channels Ch1, Ch2, Ch3 and Ch4 have respectively for central frequency $f_{u1}$, $f_{u2}$, $f_{u3}$, and $f_{u4}$. Likewise, channels Ch5, Ch6, Ch7 and Ch8 have respectively for central frequency $f_{u1}$, $f_{u2}$, $f_{u3}$, and $f_{u4}$. According to the frequency plan PD2, the channels Ch1, Ch3, Ch5 and Ch7 have for central frequency fd1 and the channels Ch2, Ch4, Ch6 and Ch8 have for central frequency $f_{d2}$. Considering that the frequency spacing Δf between channels is constant, both on the uplink and on the downlink, one has the following relationship:

$$\Delta f = f_{u2}-f_{u1}=f_{u3}-f_{u2}=f_{u4}-f_{u3}=f_{d2}-f_{d1}$$

The frequency translation fTn realized by the frequency converters of the payload corresponds, for a given channel, to the difference between the uplink frequency and the downlink frequency, i.e.:

$$f_{Tn}=f_{un}-f_{dm} \text{ with n varying from 1 to 8 and m being equal to 1 or 2.}$$

Consequently, it is clearly apparent that according to the frequency plan PD1, the frequency translation is different according to each channel, such that it is necessary to have a frequency converter for each channel and each polarization.

On the other hand, in the case of the frequency plan PD2, the judicious regrouping of the channels leads to the channels 1 and 2 sharing the same frequency translation ($f_{t1}=f_{t2}=f_{u1}-f_{d1}=f_{u2}-f_{d2}$) whilst the channels 3 and 4 likewise share the same frequency translation ($f_{t3}=f_{t4}=f_{u3}-f_{d1}=f_{u4}-f_{d2}$) different from the translation $f_{t1}$. The same reasoning can be made respectively for the channels 5 and 6 and for the channels 7 and 8 such that:

$$f_{T1}=f_{T2}=f_{T5}=f_{T6} \text{ and } f_{T3}=f_{T4}=f_{T7}=f_{T8}.$$

Consequently, the scenario 2 (frequency plan PD2) allows only one frequency converter to be used per pair of channels and allows a reduction by 2 of the number of frequency converters with respect to the scenario 1 (frequency plan PD1).

It will be noted that the scenario 1 (without constraint linked to a regrouping in the frequency plan) involves the use of a payload architecture such as that described with reference to FIG. 2b). The scenario 2 (with constraint linked to a regrouping in the frequency plan) allows a payload architecture to be used such as the payload 200 illustrated in FIG. 2c).

After reception and selection of the polarization, the received signal is amplified by a low noise amplifier 212 LNA. The signal is then separated into $N_s/2$ pairs of uplink channels by a signal divider device 213. The $N_s$ pairs of uplink channels are then translated in frequency by a frequency converter circuit 214; they are then multiplexed and filtered by an input multiplexer 215 so as to form $N_s/2$ channel pairs in accordance with the downlink frequency plan PD2.

The $N_s/2$ signals of two filtered and translated frequency channels are amplified through a high power amplifier 216 HPA generally formed by a channel amplifier 217 CAMP and a travelling wave tube amplifier 218 TWTA forming $N_s/2$ signals regrouping two downlink spots. Each of the $N_s/2$ signals regrouping two spots is then separated and filtered through a multiplexer and output band pass filter 219 so as to form two downlink spot signals.

Each of the Ns downlink spot signals is then sent on a feed 220 such as a feedhorn which radiates towards a reflector for the formation of a spot. According to this configuration, if one designates by $N_{GW}$ the gateway number, the payload comprises:

- $2N_{GW}$ low noise amplifiers 212 LNA;
- $2N_{GW}$ signal divider devices 213;
- $N_s/2$ frequency converter circuits 214;
- $N_s/2$ input multiplexers 215;
- $N_s/2$ high power amplifiers 216 HPA;
- $N_s/2$ output demultiplexers 219;
- $N_s$ feedhorns 220.

Apart from the fact that the payload 200 (like the payload 100 of FIG. 2b)) allows the reduction by a factor N (N=2) of the number of TWTA used with respect to the payload 10 of FIG. 2a), it will be noted that the frequency constraint imposed by the scenario 2 allows the reduction by two of the number of converters 214 with respect to the configuration of FIG. 2b); in the more general hypothesis of a division of N spots per tube, the downlink frequency plan can be adapted to allow the use of $N_s/N$ converters instead of $N_s$.

As already mentioned above, the band pass capacity $C_{FWD}$ of the satellite is defined by the following formula:

$$C_{FWD} = \text{Min}\left(\frac{P_{FWD}N_s G}{eirp}, N_s B_{spot}\right).$$

The first term represents the limitation in power, whilst the second term represents the band pass limitation. When the payload is designed, one of the objectives to be attained consists in making the two terms equal with each other.

The area of the covering zone of a payload can be defined by the following relationship:

$$A_{ser} = N_s A_{cell}$$

in which:
- $A_{ser}$ designates the area of the covering zone expressed in degrees squared ($^{2\circ}$),
- $A_{cell}$ designates the area of a cell which one can define as the area of the covering zone supported by each of the spots.

Figures 4A, 4B:
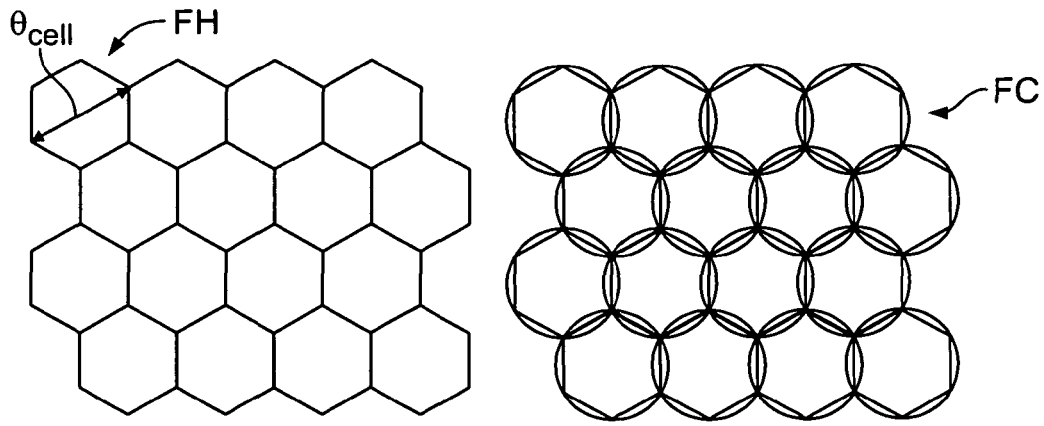
FIG. 4a) represents an example of covering zone composed of a plurality of disjoined hexagons.
FIG. 4b) represents an approximation of the covering zone of FIG. 4a) composed of a plurality of circular spots.

In a homogeneous multispot covering zone, each cell is represented by a hexagon such that the covering zone is composed of a plurality of disjoined hexagons FH as illustrated in FIG. 4a). The area of each cell is given by the formula:

$$A_{cell} = \frac{3\sqrt{3}\,\theta_{cell}^2}{8}$$

in which $\theta_{cell}$ is the external dimension of the cell expressed by the angle of the satellite associated with the covering.

The area of the covering zone is therefore given by the following relationship:

$$A_{ser} = \frac{3\sqrt{3}\,N_s \theta_{cell}^2}{8}$$

However, the antenna spot is not capable of producing a hexagonal form; a good approximation consists in considering a plurality of circular spots FC such as represented in FIG. 4b) and each having a covering surface given by the relationship:

$$A_{beam} = \frac{\pi(\theta_{cell} + 2\varepsilon)}{4}$$

taking into account a pointing error E linked to the precision of the antenna.

Generally, the gain of the antenna is given by the following formula:

$$G = \frac{k}{(\theta_{cell} + 2\varepsilon)^2}$$

in which k is a proportionality constant.

Consequently, the capacity can be expressed by the following formula:

$$C_{FWD} = \frac{P_{FWD} N_s k}{eirp(\theta_{cell} + 2\varepsilon)^2}$$
$$= \frac{P_{FWD} N_s k}{eirp \cdot \theta_{cell}^2 \left(1 + 2\frac{\varepsilon}{\theta_{cell}}\right)^2}$$

Proceeding from a hypothesis where:
- the capacities are identical in a conventional architecture such as that of FIG. 2a) and in an architecture with division of N spots by each TWTA tube (FIG. 2b) or 2c)),
- the two architectures present the same eirp per spot and use TWTA tubes presenting the same power RF, one obtains:

$$C_{FWD} = \frac{P_{FWD} N_s k}{eirp \cdot \theta_{cell,1}^2 \left(1 + 2\frac{\varepsilon_1}{\theta_{cell,1}}\right)^2}$$
$$= \frac{P_{FWD} N_s k}{N \cdot eirp \cdot \theta_{cell,N}^2 \left(1 + 2\frac{\varepsilon_N}{\theta_{cell,N}}\right)^2}$$

If one assumes by a mathematical simplification that $$\frac{\varepsilon_1}{\theta_{cell,1}} = \frac{\varepsilon_N}{\theta_{cell,N}},$$

one therefore has: $\theta_{cell,1}^2 = N\theta_{cell,N}^2$

The area of the covering surface (noted respectively $A_{ser,1}$ for the conventional architecture and $A_{ser,N}$ for the architecture with division of N spots by each TWTA tube) is therefore given by the following formula:

$$A_{ser,1} = \frac{3\sqrt{3}\,N_s \theta_{cell,1}^2}{8} \text{ and}$$

$$A_{ser,N} = \frac{3\sqrt{3}\,N_s \theta_{cell,N}^2}{8}$$
$$= \frac{3\sqrt{3}\,N_s \theta_{cell,1}^2}{8N}$$
$$= \frac{A_{ser,1}}{N}$$

Thus, it can be noted that remaining at constant capacity, the fact of passing from a conventional architecture to an architecture with TWTA with N spots induces a reduction of a factor N of the number of TWTA and of the covering zone, the number of spots remaining constant.

The payloads 300 and 400 such as represented in FIGS. 2d) and 2e) are respectively identical to the payloads 100 and 200 of FIGS. 2b) and 2c) except that they comprise $N_s$ CAMP (respectively 317 and 417) and $N_s$ TWTA (respectively 318 and 418) instead of $N_s/2$ CAMP and $N_s/2$ TWTA, namely N times more amplifier equipment (with N=2). In other words, the number of spots provided by the payloads 300 and 400 is equal to N×$N_s$ (with N=2).

Proceeding from a new hypothesis where:
- the eirp per spot are identical in a conventional architecture such as that of FIG. 2a) and in an architecture with division of N spots by each TWTA tube (FIG. 2d) or 2e)),
- the two architectures use TWTA tubes presenting the same power RF, one obtains:

$$\frac{C_{FWD,N}}{C_{FWD,1}} = \frac{N_{s,N}(\theta_{cell,1} + 2\varepsilon_1)^2}{NN_{s,1}(\theta_{cell,N} + 2\varepsilon_N)^2}$$
$$= \frac{N_{s,N}\theta_{cell,1}^2}{NN_{s,1}\theta_{cell,N}^2}$$

By constraining the two systems to present the same covering zone, one obtains:

$$N_{s,1}\theta_{cell,1}^2 = N_{s,N}\theta_{cell,N}^2$$
$$= \frac{N_{s,N}\theta_{cell,1}^2}{N}$$

The relation between the capacity $C_{FWD,1}$ for the conventional architecture and $C_{FWD,N}$ for the architecture with division of N spots by each TWTA tube is therefore given by:

$$\frac{C_{FWD,N}}{C_{FWD,1}} = N$$

Thus, the passage of a configuration such as that of FIG. 2a) to a configuration such as that of FIG. 2d) or 2e) allows the multiplication of the capacity by N (with N=2 in the illustrated examples).

According to the above, one can therefore define two criteria (criterion 1 and criterion 2) according to whether one wishes to conserve the same covering surface or the same capacity with respect to the conventional architecture of FIG. 2a): these two criteria are summarized in Table 1 below:

TABLE 1

| Criterion | Covering zone | Number of spots | Number of TWTA | Capacity |
|---|---|---|---|---|
| 1 | Reduction of a factor N | No change | Reduction of a factor N | No change |
| 2 | No change | Increase of a factor N | No change | Increase of a factor N |

The conclusions of Table 1 above are confirmed by the numeric values of Table 2 below, given respectively for a conventional payload of capacity C such as the payload 10 of FIG. 2 a), an optimized payload of capacity C (criterion 1) such as the payload 100 or 200 of FIG. 2b) or 2c), an optimized payload of capacity 2×C (criterion 2 with N=2) such as the payload 300 or 400 of FIG. 2d) or 2e) and a conventional payload of capacity 2×C (not shown; this load is identical to the conventional load 10 but comprising two times more equipment, i.e. comprising 2$N_s$ converters, input filters, CAMP, TWTA, output filters and horns).

TABLE 2

| | Conventional payload of capacity C | Criterion 1 | Criterion 2 | Conventional payload of capacity 2C |
|---|---|---|---|---|
| Area of covering zone | 9.4°² | 4.7°² | 9.4°² | 9.4°² |
| Number of spots | 40 | 40 | 80 | 80 |
| Area of a cell | 0.24°² | 0.12°² | 0.12°² | 0.12°² |
| External dimension of a cell | 0.60° | 0.43° | 0.43° | 0.43° |
| Pointing error | 0.06° | 0.04° | 0.04° | 0.04° |
| Beam dimension | 0.72° | 0.51° | 0.51° | 0.51° |
| Gain of the antenna | 44.2 dBi | 47.2 dBi | 47.2 dBi | 47.2 dBi |
| Number of TWTA | 40 | 20 | 40 | 80 |
| RF power of a TWTA | 130 W | 130 W | 130 W | 65 W |
| EIRP of the system* | 76.5 dBW | 76.5 dBW | 79.5 dBW | 79.5 dBW |
| Capacity | 10.0 GHz | 10.0 GHz | 20.1 GHz | 20.1 GHz |

*Corresponds to the total eirp provided by the system and not to the eirp available per spot; thus, a double capacity with respect to a reference system must provide a double eirp of this system, namely 3 dB more."

Below the configuration of the different payloads described above are analyzed with reference to FIGS. 2a) to 2e) in terms of mass balance. Concerning the reference payload as represented in FIG. 2a) with a single spot by TWTA and a capacity C, the mass of this payload is expressed as follows:

$$M_{FWD,1,C} = 2N_{GW}m_{LNA} + 2N_{GW}m_{split} + N_s m_{FC} + N_s m_{TWTA} + N_s m_f + N_a m_{refl} G_1 \quad \text{(Relation 1)}$$

Where $M_{FWD}$ is the mass of the payload 10, $m_{LNA}$ is the mass associated with the low noise amplifier 12, $m_{split}$ is the mass associated with the divider device 13, $m_{FC}$ is the mass associated with the frequency converter, $m_{TWTA}$ is the mass associated with the high power amplifier 16, $m_f$ is the mass associated with each antenna feed 20, $m_{refl}$ is the specific mass associated with the reflectors and with the structure of the antenna as a function of gain, $N_a$ is the number of antennae, G is the gain of the antenna expressed in the form of a ratio (and not in dB).

It will be noted that the contribution of the filters 15 and 19 will be considered as identical in all the configurations studied below and will therefore not be taken into account in the calculations.

Concerning a reference payload with a single spot per TWTA and a capacity N×C, it will be identical to that of FIG. 2a) but comprising N times more equipment, i.e. comprising N×$N_s$ converters, input filters, CAMP, TWTA, output filters and horns. Consequently, the mass of this reference payload with a capacity N×C is expressed as follows:

$$M_{FWD,1,NC} = 2NN_{GW}m_{LNA} + 2NN_{GW}m_{split} + NN_s m_{FC} + NN_s m_{TWTA} + NN_s m_f + NN_a m_{refl} G_1 \quad \text{(Relation 1')}$$

In the following, we will place ourselves under the hypothesis of criterion 1 mentioned above (maintained capacity C). As already described, two scenarios are possible, according to whether one introduces no frequency constraint (scenario 1 of FIG. 2b)) or one introduces a frequency constraint (scenario 2 of FIG. 2c)).

Criterion 1
Scenario 1

The mass of the payload of FIG. 2b) is expressed as follows:

$$M_{FWD} = 2N_{GW}m_{LNA} + 2N_{GW}m_{split} + N_s m_{FC} + \frac{N_s m_{TWTA}}{N} + N_s m_f + NN_a m_{refl} G_1$$

Comparing this relation 2 with the relation 1 above (FIG. 2a)), the difference between the two relations gives us:

$$\Delta M_{FWD} = M_{FWD,1,C} - M_{FWD} \quad \text{(Equation 1)}$$
$$= \left(1 - \frac{1}{N}\right) N_s m_{TWTA} - (N-1) N_a m_{refl} G_1$$

Scenario 2

Figure 2C:
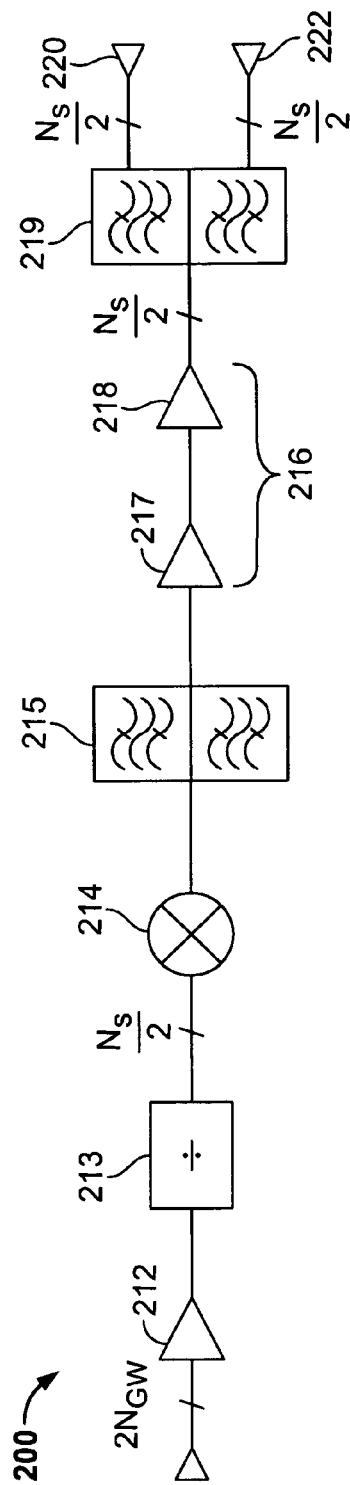
FIGS. 2d) and 2e) each represent a functional block diagram of an architecture of optimized payload by the method according to the invention as a function of the second criterion, respectively without and with constraint on the frequency plan.

The mass of the payload of FIG. 2c) is expressed as follows:

$$M_{FWD} = 2N_{GW}m_{LNA} + 2N_{GW}m_{split} + \frac{N_s m_{FC}}{N} + \frac{N_s m_{TWTA}}{N} + N_s m_f + NN_a m_{refl} G_1 \quad \text{(Relation 3)}$$

Comparing this relation 3 with the relation 1 above (FIG. 2a)), the difference between the two relations gives us:

$$\Delta M_{FWD} = M_{FWD,1,C} - M_{FWD} \quad \text{(Equation 2)}$$
$$= N_s\left(1 - \frac{1}{N}\right)(m_{FC} + m_{TWTA}) - (N-1) N_a m_{refl} G_1$$

Figure 5:
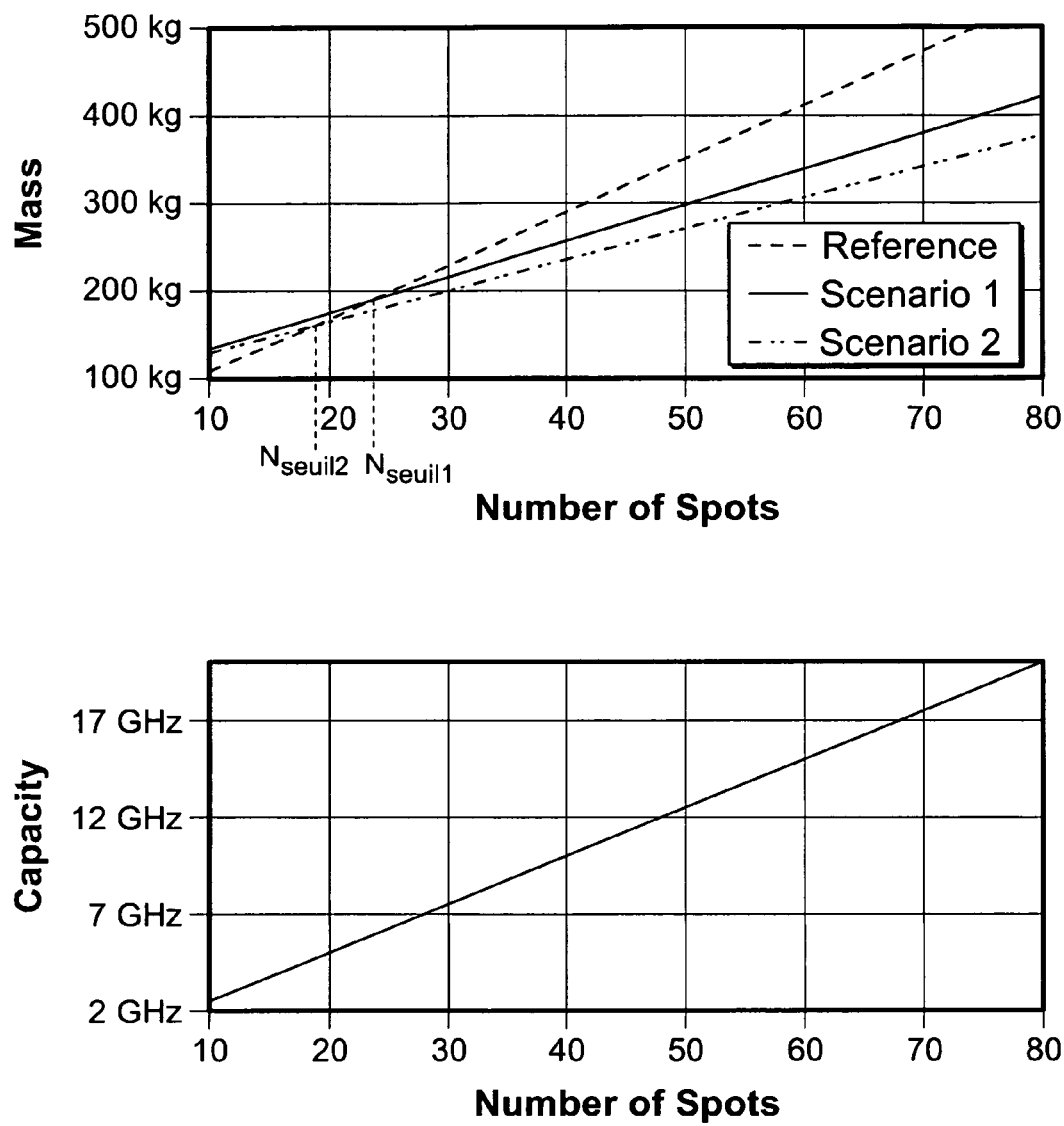
FIG. 5 represents the linear evolution of the mass of the payload as a function of the number of spots in three configurations of payload and also the evolution of the capacity as a function of the number of spots.

FIG. 5 represents the linear evolution of the mass of the payload as a function of the number of spots in the three cases mentioned above (Relation 1: reference case of FIG. 2a)—Relation 2: case of scenario 1—Relation 3: case of scenario 2) in the case where N=2. It will be noted that as the two first terms are identical in the three relations 1 to 3, they have been omitted in the representation of FIG. 5: this omission allows the representation to be made independent of the input section and entails solely a staggering according to the axis of the ordinates.

The intersection, respectively of the reference line and of the line linked to scenario 1 and of the reference line and of the line linked to the scenario 2, corresponds to the resolution of $\Delta M_{FWD}=0$ (respectively for Equation 1 and Equation 2).

It is consequently found that, beyond a threshold value ($N_{threshold1}$ for the payload of scenario and $N_{threshold2}$ for the payload of scenario 2) of the number of spots, the mass of the payload of scenarios 1 and 2 is less than the reference payload. In the case of FIG. 5, it is observed that $N_{threshold1}$ is approximately equal to 23 and that $N_{threshold2}$ is approximately equal to 18. Typically, for N=2 (two spots per TWTA) one will take threshold number of spots $N_{threshold}$ greater than 15 and preferably greater than 20. Of course, the fact of imposing a frequency constraint (FIG. 2c)) allows the mass of the payload to be reduced more.

FIG. 5 likewise represents the linear evolution of the capacity as a function of the number of spots. It is found that the threshold number of spots beyond which the configurations of FIG. 2b) or 2c) are more advantageous than the reference configuration can likewise be expressed by a threshold capacity: in the case of 20 spots for example, the threshold capacity is approximately equal to 5 GHz.

In conclusion, the optimization method according to the invention allows the optimization in terms of mass of a reference payload passing to a payload comprising amplifier tubes each amplifying N (N=2) spots when the capacity is greater than 5 Ghz in the example above (or when the number of spots is greater than 20). Of course, the threshold spot number or the threshold capacity depends on the different masses of the components and on the selected technology.

Furthermore, it should be noted that the mass could equally take into account the auxiliary equipment and also the equipment necessary to ensure redundancy functions in the case of breakdown; to simplify the presentation, these contributions have not been taken into account. However, these disregarded contributions do not alter the result which is obtained. In addition, in so far as the number of equipment items is reduced (reduction in the number of amplifiers in the case of scenarios 1 and 2, in fact the number of frequency converters in the case of scenario 2), the taking into account of the redundancy equipment would only be more advantageous in terms of mass gain.

Similar comparison calculations between the reference configuration and the configurations with several spots per amplifier show that the optimization allows not only a gain in terms of mass of the payload but equally a reduction in terms of power requirement DC necessary and of thermal dissipation.

In the following, we will place ourselves under the hypothesis of criterion 2 mentioned above (capacity C multiplied by N). As already described, two scenarios are possible, according to whether one introduces no frequency constraint (scenario 1 of FIG. 2d)) or one introduces a frequency constraint (scenario 2 of FIG. 2e)).

It will be noted in addition that the noted number of spots $N_s$ below corresponds to the total number of spots of criterion 1; in the case of criterion 2, the total number of spots is $N \times N_s$, the notation of criterion 1 having been maintained to conserve a certain normalisation.

Criterion 2
Scenario 1

The mass of the payload of FIG. 2d) is expressed as follows:

$$M_{FWD} = 2NN_{GW}m_{LNA} + 2NN_{GW}m_{split} + NN_s m_{FC} + N_s m_{TWTA} + NN_s m_f + NN_a m_{refl} G_1 \quad \text{(Relation 2')}$$

Comparing this relation 2' with relation 1', the difference between the two relations gives us:

$$\Delta M_{FWD} = M_{FWD,1,NC} - M_{FWD} \quad \text{(Equation 1')}$$
$$= (N-1) N_s m_{TWTA}$$

Scenario 2

The mass of the payload of FIG. 2e) is expressed as follows:

$$M_{FWD} = 2NN_{GW}m_{LNA} + 2NN_{GW}m_{split} + N_s m_{FC} + N_s m_{TWTA} + NN_s m_f + NN_a m_{refl} G_1 \quad \text{(Relation 3')}$$

Comparing this relation 3' with relation 1', the difference between the two relations gives us:

$$\Delta M_{FWD} = M_{FWD,1,NC} - M_{FWD} \quad \text{(Equation 2')}$$
$$= (N-1)N_s(m_{FC} + m_{TWTA})$$

A resolution of the equation $\Delta M_{FWD}=0$, for equation 1' and for equation 2', shows that whatever the value of the number of spots, each of the configurations of FIG. 2d) or 2e) is more advantageous in terms of mass than the reference configuration of identical capacity N×C using one spot per TWTA tube. It is therefore found that, contrary to criterion 1, the application of criterion 2 always entails a more favourable situation on the mass balance when several spots are shared on a same tube.

In addition, it is important to note that passing from a reference configuration with a capacity C (FIG. 2a)) to an optimized configuration (FIG. 2d) or 2e)), the capacity and the number of spots are doubled without doubling the mass. In other words, the mass of optimized payload is increased by a factor less than N (N=2). Furthermore, the merit figure of the satellite on the return link is a direct function of the number of spots; consequently, this merit figure will increase considerably.

As for criterion 1, similar comparison calculations between the reference configuration of capacity 2×C and the configurations with several spots per amplifier show that the optimization allows not only a gain in terms of mass of the payload but equally a reduction in terms of power requirement DC necessary and of thermal dissipation.

Of course, the invention is not limited to the form of embodiment which has just been described. In particular, the invention has been described more particularly in the case where N is equal to 2; the method according to the invention is applicable to any natural whole number N strictly greater than 1 so that the number is spots $N_s$ is a multiple of N.

Furthermore, we have more specifically described the case of a chain of amplification comprising a CAMP followed by a TWTA. However, it will be noted that the method according to the invention is equally applicable to the case of an amplifier SSPA or equipment of the MPA type. In the case of an MPA, of constant capacity and from a threshold spot number or a threshold capacity value, the reference MPA equipment comprising $N_s$ inputs and $N_s$ outputs and intended to amplify $N_s$ spots is replaced by MPA equipment comprising $N_s/N$ inputs and $N_s/N$ outputs and intended to amplify $N_s$ spots distributed over the $N_s/N$ inputs. When the capacity C is multiplied by N, the reference MPA equipment comprising $N_s$ inputs and $N_s$ outputs and intended to amplify $N_s$ spots is replaced by MPA equipment comprising $N_s$ inputs and $N_s$ outputs and intended to amplify N×N, spots distributed over the $N_s$ inputs.

Finally, any means can be replaced by an equivalent means.

What is claimed is:

1. A method for optimization of a payload of a multispot telecommunication satellite to define an optimized payload from a reference payload for the formation of $N_s$ spots on a downlink, $N_s$ being a natural whole number strictly greater than 1, the reference payload comprising amplification means formed:
   either by $N_s$ first amplification units comprising an input and an output, each of the $N_s$ first amplification units being intended to amplify a spot,
   or by a first amplification equipment comprising $N_s$ inputs and $N_s$ outputs and intended to amplify the $N_s$ spots,
the optimization being realized in response to one of the following two criteria:
   first criterion: a capacity C of said reference payload is conserved and an area of a covering zone of the said payload is divided by N, N being a natural whole number strictly greater than 1 so that $N_s$ is a multiple of N;
   second criterion: the area of the covering zone of said payload is conserved and said capacity C is multiplied by N;
according to said first criterion, said method comprises the following steps:
   comparing said number $N_s$ of spots with a threshold number of spots $N_{threshold}$ or comparing said capacity C with a threshold capacity $C_{threshold}$;
   if $N_s$ is greater than $N_{threshold}$ or if the capacity of C is greater than $C_{threshold}$:
      when said amplification means are formed by said $N_s$ first amplification units: substituting in said optimized payload of said $N_s$ first units $N_s/N$ second amplification units, each of the $N_s/N$ second amplification units being intended to amplify N spots;
      when said amplification means are formed by said first amplification equipment: substituting in said optimized payload of said first amplification equipment a second amplification equipment comprising $N_s/N$ inputs and $N_s/N$ outputs and intended to amplify the $N_s$ spots distributed over said $N_s/N$ inputs;
according to said second criterion, said method comprises the following stages:
   when said amplification means are formed by said $N_s$ first amplification units: substituting in said optimized payload of said $N_s$ first units $N_s$ third amplification units, each of said $N_s$ third amplification units being intended to amplify N spots;
   when said amplification means are formed by said first amplification equipment:
   substituting in said optimized payload of said first equipment a third amplification equipment comprising $N_s$ inputs and $N_s$ outputs and intended to amplify N×$N_s$ spots distributed over said $N_s$ inputs.

2. The method according to claim 1, wherein a determination of said threshold number of spots $N_{threshold}$ comprises the following steps:
   determining the mass of said reference payload as a function of the number of spots $N_s$;
   determining the mass of the optimized payload as a function of the number of spots $N_s$;
   determining of said $N_{threshold}$ when the respective masses of said reference payload and said optimized payload are equal.

3. The method according to claim 1 wherein the natural whole N is equal to 2.

4. The method according to claim 1 wherein the threshold number of spots $N_{threshold}$ is greater than 15.

5. The method according to claim 4 wherein the threshold number of spots $N_{threshold}$ is greater than 20.

6. The method according to claim 1 wherein said first amplification units are formed by traveling wave tubes TWTA.

7. The method according to claim 6 wherein said second and third amplification units are traveling wave tubes TWTA.

8. The method according to claim 1 wherein said first amplification units are formed by semiconductor amplifiers SSPA.

9. The method according to claim 8 wherein said second and third amplification units are formed by semiconductor amplifiers SSPA.

10. The method according to claim 1 wherein said first amplification equipment are formed by multiport amplifiers MPA.

11. The method according to claim 10 wherein said second and third amplification equipment are formed by multiport amplifiers MPA.

12. The method according to claim 1 wherein a stage of reduction of a factor N of a number of frequency converters is comprised in said optimized payload by regrouping by a group of N channels in a downlink frequency plan.

13. The method according to claim 1 wherein said threshold capacity $C_{threshold}$ is greater than or equal to 5 Ghz.

14. A method for optimization of a payload of a multispot telecommunication satellite to define an optimized payload from a reference payload for the formation of $N_s$ spots on a downlink, $N_s$ being a natural whole number strictly greater than 1, the reference payload comprising $N_s$ first amplifiers comprising an input and an output, each of the $N_s$ first amplifiers being intended to amplify a spot, the optimization being realized in response to one of the following two criteria:

first criterion: a capacity C of said reference payload is conserved and an area of a covering zone of the said payload is divided by N, N being a natural whole number strictly greater than 1 so that $N_s$ is a multiple of N;

second criterion: the area of the covering zone of said payload is conserved and said capacity C is multiplied by N;

according to said first criterion, said method comprises the following steps:

comparing said number $N_s$ of spots with a threshold number of spots $N_{threshold}$ or comparing said capacity C with a threshold capacity $C_{threshold}$;

if $N_s$ is greater than $N_{threshold}$ or if the capacity of C is greater than $C_{threshold}$, substituting in said optimized payload of said $N_s$ first units $N_s/N$ second amplifiers, each of the $N_s/N$ second amplifiers being intended to amplify N spots;

according to said second criterion, said method comprises the following stages:

substituting in said optimized payload of said $N_s$ first units $N_s$ third amplifiers, each of said $N_s$ third amplifiers being intended to amplify N spots.

15. The method as recited in claim 14 wherein the first amplifier includes a traveling wave tube TWTA or semiconductor amplifier SSPA.

16. A method for optimization of a payload of a multispot telecommunication satellite to define an optimized payload from a reference payload for the formation of $N_s$ spots on a downlink, $N_s$ being a natural whole number strictly greater than 1, the reference payload comprising first amplification equipment comprising $N_s$ inputs and $N_s$ outputs and intended to amplify the $N_s$ spots, the optimization being realized in response to one of the following two criteria:

first criterion: a capacity C of said reference payload is conserved and an area of a covering zone of the said payload is divided by N, N being a natural whole number strictly greater than 1 so that $N_s$ is a multiple of N;

second criterion: the area of the covering zone of said payload is conserved and said capacity C is multiplied by N;

according to said first criterion, said method comprises the following steps:

comparing said number $N_s$ of spots with a threshold number of spots $N_{threshold}$ or comparing said capacity C with a threshold capacity $C_{threshold}$;

if $N_s$ is greater than $N_{threshold}$ or if the capacity of C is greater than $C_{threshold}$: substituting in said optimized payload of said first amplification equipment a second amplification equipment comprising $N_s/N$ inputs and $N_s/N$ outputs and intended to amplify the $N_s$ spots distributed over said $N_s/N$ inputs;

according to said second criterion, said method comprises the following stages:

substituting in said optimized payload of said first equipment a third amplification equipment comprising $N_s$ inputs and $N_s$ outputs and intended to amplify $N \times N_s$ spots distributed over said $N_s$ inputs.

17. The method according to claim 16 wherein said first amplification equipment includes a multiport amplifier MPA.

* * * * *